(12) United States Patent
Raybould et al.

(10) Patent No.: US 9,738,533 B2
(45) Date of Patent: Aug. 22, 2017

(54) FOULING RESISTANT SYSTEM

(75) Inventors: Derek Raybould, Denville, NJ (US); Christian Delacruz, Parsippany, NJ (US); Carl Kiser, Redondo Beach, CA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 841 days.

(21) Appl. No.: 12/969,390

(22) Filed: Dec. 15, 2010

(65) Prior Publication Data
US 2012/0156121 A1 Jun. 21, 2012

(51) Int. Cl.
*C01B 33/12* (2006.01)
*C01B 33/14* (2006.01)
*C23C 18/12* (2006.01)

(52) U.S. Cl.
CPC .............. *C01B 33/12* (2013.01); *C01B 33/14* (2013.01); *C23C 18/1216* (2013.01); *C23C 18/1254* (2013.01); *C23C 18/1283* (2013.01); *C23C 18/1295* (2013.01)

(58) Field of Classification Search
CPC .......................... C01B 33/12; C23C 18/1254
USPC ....................................... 427/376.2
See application file for complete search history.

(56) References Cited

U.S. PATENT DOCUMENTS

| | | | | |
|---|---|---|---|---|
| 3,278,785 A | * | 10/1966 | Hauth, Jr. .................... | 313/137 |
| 3,356,515 A | * | 12/1967 | McGlothlin ............ | C04B 28/26 |
| | | | | 106/14.21 |
| 5,314,518 A | * | 5/1994 | Ito et al. ......................... | 65/390 |
| 5,324,544 A | | 6/1994 | Spence et al. | |
| 6,037,289 A | * | 3/2000 | Chopin et al. .................... | 502/2 |
| 6,060,821 A | | 5/2000 | Suzuki et al. | |
| 6,403,164 B1 | * | 6/2002 | Jonschker et al. ............ | 427/387 |
| 2002/0192511 A1 | * | 12/2002 | Hruschka ................ | C04B 28/34 |
| | | | | 428/704 |
| 2006/0115660 A1 | | 6/2006 | Strangman et al. | |
| 2008/0167403 A1 | * | 7/2008 | Burkle ................. | C09D 183/04 |
| | | | | 524/1 |
| 2008/0193657 A1 | * | 8/2008 | Raybould et al. ......... | 427/397.7 |

FOREIGN PATENT DOCUMENTS

GB  2338664 A  12/1999

OTHER PUBLICATIONS

Zheludkevich, Corrosion protective properties of nanostructured sol-gel hybrid coatings to AA2024-T3, Surface and Coatings Technology, 200 (2006), p. 3084-3094.*
Scherer, Measuring permeability by the Thermal Expansion Method for Rigid or Higly Permeable Gels, Journal of Sol-Gel Science and Technology, 3, 31-14 (1994).*

* cited by examiner

*Primary Examiner* — Tabatha Penny
(74) *Attorney, Agent, or Firm* — Shimokaji IP

(57) ABSTRACT

A coating for spark plugs and engine parts is resistant to fouling. The coating may be applied to the spark plug or engine part by dipping the part in a sol gel solution, ensuring it wets the part, and extracting it at a slow, controlled rate. As the part is allowed to dry, the sol gel reacts with moisture in the air to form a thin oxide film. Unlike conventional sol gel applications, which apply the oxide directly to the part, the present invention may form an oxide coating, in situ, while drying in place on the part.

14 Claims, No Drawings

FOULING RESISTANT SYSTEM

BACKGROUND OF THE INVENTION

The present invention relates to apparatus and methods for resisting fouling and, more particularly, to apparatus and methods for resisting fouling in spark plugs, engine parts and exhaust gas recirculation systems.

Fouling by carbon deposits on the spark plug insulation allows the electric charge to the center electrode to run to earth rather than jump across the plug tip. In the extreme, this results in no spark or it may just reduce the spark intensity causing incomplete burning of the gas/air mixture, resulting in a loss of engine efficiency and promoting further fouling. Fouling is more prone to occur if the engine is only used for short periods so that the engine, and hence the spark plug insulator, never get hot enough to burn or vaporize liquid gasoline that is deposited on them.

Various engine parts, such as exhaust gas coolers, exhaust valves, and turbocharger compressors/turbines may also be prone to fouling. New diesel exhaust gas recirculation systems (high pressure loop and low pressure loop), required for complying with emissions control standards, are also prone to fouling. Fouling allows a loss of efficiency, leading to about 3 to 6 percent increase in fuel consumption, as well as durability and reliability issues. Functional failure of these system components due to fouling can lead to emissions noncompliance. This can result in government fines.

The cost of heat exchanger fouling due to cleaning, fluid treatment, additional hardware, and loss of production has been estimated at approximately 0.25% of the GDP. Compact heat exchangers are generally designed with 15-25% excess surface to accommodate the fouling related drop in heat transfer capacity. Also, there is an increase in gas side pressure loss due to fouling which results in an increase in vehicle fuel consumption of up to 6%.

As can be seen, there is a need for apparatus and methods for reducing fouling of spark plugs, heat exchangers and other engine parts.

SUMMARY OF THE INVENTION

In one aspect of the present invention, a method for coating a part comprises coating a surface of the part with a sol gel solution containing an organo-metallic compound; converting the organo-metallic compound to a metal oxide by air drying the coated part; and heating the part to remove organic reaction by-products.

In another aspect of the present invention, a method for preventing fouling of an engine component comprises coating a surface of the engine component with a sol gel solution containing an organo-metallic compound; converting the organo-metallic compound to a metal oxide by air drying the coated engine component; ensuring full conversion of the organo-metallic compound to the metal oxide by allowing the dried coated engine component to stand; heating the coated engine component to remove organic reaction by-products; and bonding/heating the coated engine component at a temperature from about 600 to about 1100° C.

In a further aspect of the present invention, an engine component is coated by the process of coating a surface of the part with a solution containing an organo-metallic compound; converting the organo-metallic compound to a metal oxide by air drying the coated part; and heating the part to remove organic reaction by-products.

These and other features, aspects and advantages of the present invention will become better understood with reference to the following description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention provide a coating for spark plugs, heat exchangers and engine parts that are resistant to fouling. The engine parts may be parts from various types of engines, including, for example, internal combustion, diesel, and turbine engines. The coating may be applied to the spark plug, heat exchanger or engine part by dipping the part in a sol gel solution, ensuring it wets the part, and extracting it at a slow, controlled rate. As the part is allowed to dry, the sol gel reacts with moisture in the air to form a thin oxide film. Unlike conventional sol gel applications, which apply the oxide directly to the part, the present invention may form an oxide coating while drying in place on the part.

A coating can change the properties of a spark plug's ceramic insulator surface so that the probability of vapors of gas and oil depositing on the ceramic may be reduced. Spark plugs operate in an extreme environment involving periods at high temperatures, so the conventional anti wetting/hydrophobic coatings do not have a long life, if they survive at all. In fact, it is questioned whether hydrophobic coatings can have any effect when temperatures are routinely above the boiling point of water. It was also questionable if these types of coatings would apply to gasoline and oil, especially in an engine environment. Even so, it was found that the application of a silica coating applied via a sol gel reduced fouling. The coating is a ceramic and thus can be exposed to the extreme temperatures of the engine environment. The coating may be thin, well-bonded to the engine part (spark plug insulation or other engine part) with a similar coefficient of expansion, and can withstand thermal and pressure cycling. The ability to withstand high temperatures may allow any fouling that does occur to be burnt off during extended periods of engine use, while the coating remains and acts like a new coating. The coating, by keeping the surface clean, may allow other surface modifications, such as fine dimples to recreate the "lotus effect" to work in the engine environment, so the surface becomes self cleaning. These "dimples", irregularities or whiskers may be obtained by adding micro or nano particles to the solution. The particles can be spherical, irregular or whisker shaped.

In some embodiments of the present invention, the coating may be applied by dipping the engine part in a sol gel solution, ensuring the sol gel solution wets the part, and then extracting the part at a slow controlled rate. The part is then allowed to dry, during which time the sol gel may react with moisture in the air to form a thin oxide film. This film is then dried at about 200 to 500° C., typically at about 350° C., to drive off any organics. The resulting part may then be bonded/sintered at about 600° C. to about 1100° C. To build up the coating thickness, multiple dips may be carried out prior to this final sintering operation. Normally, the coating is from about 1 to about 3 microns thick. In some embodiments the part is a natural container, e.g. a radiator or heat exchanger, and the solution may be poured into the part and then drained from it slowly at a predetermined rate, so that the part's interior is coated as in the dipping process.

The coating operation may be low cost and can be automated. The coating operation may apply a continuous thin coating, which may change the properties of the part's surface. The coatings have other benefits. Tests have indicated the coating delayed the onset of type II hot corrosion at 1290° F. in a salt and $SO_2$ environment and reduced oxidation at 1900° F.

In addition to spark plugs, other automotive parts, such as exhaust gas coolers, precoolers, charge air coolers, recouperators, exhaust valves and turbocharger compressors/turbines may also be prone to fouling. The sol gel coatings of the present invention may delay the onset of deposits in these applications.

The composition of the coating may be varied by changing the chemistry of the sol gel. Various organo-metallic compounds may be used to make the sol gel. The organo-metallic compounds may be, for example, a metal alkoxide. Possible coatings include zirconia, zircon, silica, alumina or mixtures thereof. Layers of different compositions may also be applied. For example, an alumina layer may be formed on the surface of the part and a silica layer may be formed over the alumina layer.

According to an exemplary embodiment of the present invention, an alumina coating may be synthesized on the part and not just deposited on the surface as it would be in a slurry coating from a solution containing alumina particles. The sol gel of the present invention may be transformed to an alumina coating by a chemical reaction with moisture in the surrounding atmosphere. The ceramic coating may be formed on the part, not deposited as individual particles as it would be for a conventional slurry-type coating.

The process may be further understood by considering the chemical reactions involved. A simplified example of the reactions involved in the synthesis of alumina is as follows:

$$Al(OC_4H_9)_3 + H_2O = Al(OC_4H_9)_2(OH) + C_4H_9OH \quad (I)$$

$$2Al(OC_4H_9)_2(OH) = 2AlO(OH) + yC_4H_9OH \quad (II)$$

$$2Al(OC_4H_9)_2(OH) + 2H_2O = 2Al(OH)_3 + 2C_4H_9OH \quad (III)$$

$$AlO(OH) \text{ or } Al(OH)_3 = Al_2O_3 + zH_2O \quad (IV)$$

An aluminum alkoxide, such as aluminum sec-butoxide, may react with water from, for example, moisture in the air, to yield an aluminum alkoxide-hydroxide and an alcohol (reaction (I)). The resulting aluminum alkoxide-hydroxide may be converted to aluminum oxide-hydroxide (reaction (II)) or the aluminum alkoxide-hydroxide may react with additional water to yield aluminum hydroxide (reaction (III)). The resulting aluminum oxide-hydroxide or the aluminum hydroxide may be converted to aluminum oxide (alumina) (reaction (IV)). The sequence of reactions ((I) through (IV)) may take place after the sol gel solution has been coated on the part, while the coating is drying. The alcohol reaction product (for example, sec-butanol) may be removed by heating the part once the part is dried.

In a typical sol gel process, the coated substrate is hydrolyzed and subsequently polymerized in a controlled humidity environment. No special environment or humidity control may be required for the process of the present invention, making it more compatible with production facilities. Once visually dry, the coated substrate may usually be left to stand for several hours to ensure that all of the coating has transformed to an oxide. The coated substrate may then be oven-heated to about 350° C. to drive off the organics. The coated substrate is then heated in a furnace at a temperature from about 600 to about 1100° C. to bond and sinter the coating.

It should be understood, of course, that the foregoing relates to exemplary embodiments of the invention and that modifications may be made without departing from the spirit and scope of the invention as set forth in the following claims.

We claim:

1. A method for coating a spark plug or heat exchanger to prevent fouling of the spark plug or heat exchanger, comprising:
    adding previously formed micro sized particles to an existing sol gel solution, wherein the sol gel solution includes an organo-metallic compound, and the previously formed micro sized particles are whisker shaped;
    coating a surface of a spark plug or heat exchanger with the sol gel solution;
    converting the organo-metallic compound to a metal oxide by air drying the coated spark plug or heat exchanger; and
    heating the spark plug or heat exchanger to remove organic reaction by-products, wherein surface indentations are formed from the added micro sized particles.

2. The method of claim 1, wherein the metal oxide is selected from the group consisting of silica, alumina, zirconia and mixtures thereof.

3. The method of claim 1, wherein the organo-metallic compound is a metal alkoxide.

4. The method of claim 1, wherein the organic reaction by-products are removed by heating to a temperature of about 200 to 500° C.

5. The method of claim 1, further comprising ensuring that the entire organo-metallic compound is converted to the metal oxide by allowing the dried coated spark plug or heat exchanger to stand.

6. The method of claim 1, further comprising repeating the coating, converting and heating steps to form several layers of metal oxide on the spark plug or heat exchanger.

7. The method of claim 6, wherein the spark plug or heat exchanger is filled with the solution and then the liquid is slowly drained at a controlled rate.

8. The method of claim 1, wherein the coating of the surface of the spark plug or heat exchanger includes dipping the spark plug or heat exchanger in the sol gel solution and extracting it at a controlled rate.

9. The method of claim 1, further comprising bonding/sintering the coating by heating the coated spark plug or heat exchanger at a temperature from about 600° C. to about 1100° C.

10. A method for preventing fouling of an engine component, comprising:
    choosing a shape of micro sized particles to add to a sol gel solution, wherein the shape is whisker;
    adding the micro sized particles to the sol gel solution, wherein the sol gel solution includes an organo-metallic compound;
    coating a ceramic insulator surface of a spark plug with the sol gel solution to form a coating on the ceramic insulator surface, wherein the sol gel solution contains an organo-metallic compound;

converting the organo-metallic compound to a metal oxide over ceramic insulator surface by air drying the coated spark plug, wherein the particles form surface indentations in the coating;

allowing the dried coated spark plug to stand;

heating the coated spark plug to remove organic reaction by-products; and bonding/heating the coated spark plug at a temperature from about 600 to about 1100° C.

11. The method of claim 10, further comprising repeating the coating, converting, and heating steps to form a second layer of metal oxide over the ceramic insulator surface of the spark plug on the spark plug.

12. The method of claim 10, wherein the coating of the ceramic insulator surface of the spark plug includes dipping the spark plug in the sol gel solution.

13. The method of claim 12, further comprising extracting the spark plug from the sol gel at a controlled rate.

14. The method of claim 10, wherein the coating of the ceramic insulator surface of the spark plug results in a metal oxide coating of the spark plug of from about 1 to about 3 microns thick.

* * * * *